(12) United States Patent
Hu (10) Patent No.: US 7,936,575 B2
(45) Date of Patent: May 3, 2011

(54) SYNCHRONOUS RECTIFIER CONTROL USING LOAD CONDITION DETERMINATION

(75) Inventor: Jing Hu, Neubiberg (DE)

(73) Assignee: Infineon Technologies Austria AG, Villach (AT)

( * ) Notice: Subject to any disclaimer, the term of this patent is extended or adjusted under 35 U.S.C. 154(b) by 493 days.

(21) Appl. No.: 12/145,338

(22) Filed: Jun. 24, 2008

(65) Prior Publication Data

US 2009/0316441 A1  Dec. 24, 2009

(51) Int. Cl.
  *H02M 3/335* (2006.01)
(52) U.S. Cl. ............... 363/21.06; 363/21.14; 363/89
(58) Field of Classification Search .......... 363/21.06, 363/21.14, 89, 127
  See application file for complete search history.

(56) References Cited

U.S. PATENT DOCUMENTS

| | | | | |
|---|---|---|---|---|
| 7,636,249 | B2 * | 12/2009 | Hu | ............... 363/127 |
| 7,688,602 | B2 * | 3/2010 | Hu | ............... 363/21.14 |
| 2009/0231895 | A1 * | 9/2009 | Hu | ............... 363/127 |
| 2009/0268494 | A1 * | 10/2009 | Hu | ............... 363/89 |
| 2009/0316441 | A1 * | 12/2009 | Hu | ............... 363/21.06 |
| 2010/0124086 | A1 * | 5/2010 | Chen | ............... 363/127 |

OTHER PUBLICATIONS

"Synchronous Rectifier Smart Driver for Flyback," STSR30, STMicroelectronics, 2004, http://www.st.com.

* cited by examiner

*Primary Examiner* — Jeffrey L Sterrett
(74) *Attorney, Agent, or Firm* — Slater & Matsil, L.L.P.

(57) ABSTRACT

In accordance with an embodiment of the present invention, a method of operating a switched power supply is disclosed. The method comprises determining a current load on a secondary side of a transformer by measuring a ratio between a secondary side current conduction time and a primary switching period of the power supply and comparing the current load with a predetermined threshold. A synchronous rectification (SR) MOSFET coupled to the secondary side of the transformer is disabled if the current load is less than the preset threshold.

29 Claims, 10 Drawing Sheets

| $R_{EXT}$ | $V_{thB}$ MIN | $V_{thB}$ MAX | THRES-HOLD | B4~B1 | $\partial_1$ | $\partial_2$ |
|---|---|---|---|---|---|---|
| 1k5 | 0.51V | 0.92V | 1.1V | 0000 | 6.25% | 12.5% |
| 4k7 | 1.3V | 2.07V | 2.36V | 0001 | 12.5% | 25% |
| 15k | 2.65V | 3.46V | 3.68V | 0011 | 25% | 50% |
| 47k | 3.9V | 4.38V | 4.5V | 0111 | 50% | 75% |
| OPEN | | 5V | | 1111 | NO STANDBY | |

SYNCHRONOUS RECTIFIER CONTROL USING LOAD CONDITION DETERMINATION

TECHNICAL FIELD

The present invention relates generally to a circuit and method to improve the operation of a switched-mode power supply converter, and more particularly, to a circuit and method for efficient operation of a DC-DC converter circuit using a synchronous rectifier (SR).

BACKGROUND

Switched mode power supplies are efficient power supplies that achieve their power efficiency by minimizing dissipative voltage drops with the power supply circuit. Traditional switched mode power supply systems typically use diodes to control and direct and the conduction of current throughout the switched mode power supply. These diodes, however, dissipate power during the diodes' forward current conduction. One technique used to prevent power losses from the forward conduction of diodes is to use synchronous rectifier (SR) MOSFETs. Rather than dissipate power across a diode drop of about 700 mV, an SR MOSFET based power supply system can be designed to have a lower voltage drop, for example, less than 100 mV. In this way, the switched mode power converter's efficiency is significantly improved.

In practical power supply systems, however, SR MOSFET operation should be dependent on load conditions. SR MOSFETs are more efficient than series diodes when the power supply is supplying a nominal or high amount of power. Under light loads, especially at high switching frequencies, switching losses due to the charging and discharging of MOSFET device capacitance may actually exceed conduction losses in corresponding diodes. In such cases, it makes sense to deactivate these SR MOSFETs in order to save power.

In order for a switch mode power supply to be more efficient under high frequency and both high load and low load conditions, a determination needs to be made on whether or not to activate the SR MOSFET switches. One of the challenges of designing such a system is detecting a load condition and making the determination of whether to activate or deactivate the SR MOSFET switches in the power converter circuit.

One way to determine whether to activate the SR MOSFETs is to make a determination based on the turn-on duty ratio of the primary switch. The duty ratio of the primary switch, however, does not always indicate the load level of the power supply directly. For example, at high line or input voltage and certain loads. In this case the duty ratio of the primary switch is much shorter than normal conditions, but shutting off the SR MOSFET devices under low duty cycle conditions in this case would not be power efficient because of high currents running though the switching devices. Other examples of when it is more power efficient to operate SR MOSFETs when the primary duty cycle is low during start up or during overload conditions. The primary disadvantage of using the primary switch turn on duty ratio is that more accurate information about the load level is available from signals present on the secondary side of the power converter.

One possible solution for creating load dependent SR MOSFET operation is to make a real-time current measurement on the secondary coil. One low cost solution that achieves this is using a sense resistor and a valuation voltage across the sense resistor. This solution, however, is disadvantageous because of losses in the shut resistor and the difficulty of measuring current at different load levels.

What are needed are power efficient and low cost circuits and methods that sense output current conditions and use this information to determine whether to activate SR MOSFETs in a switched mode power supply system.

SUMMARY OF THE INVENTION

In accordance with an embodiment of the present invention, a method of operating a switched power supply is disclosed. The method comprises determining a current load on a secondary side of a transformer by measuring a ratio between a secondary conduction time and a primary switching period of the power supply and comparing the current load with a predetermined threshold. An SR MOSFET coupled to the secondary side of the transformer is disabled if the current load is less than the preset threshold.

The foregoing has outlined, rather broadly, features of the present invention. Additional features of the invention will be described, hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1b illustrates voltage waveforms for key nodes of the circuit illustrated in FIG. 1a;

FIG. 2b illustrates voltage waveforms for the circuit illustrated in FIG. 2a;

The figures are presented to enhance comprehension of the embodiments and are representative, are not drawn to scale, and are not limiting with respect to the embodiments, the invention or the appended claims.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a switched-mode power converter. The invention may also be applied, however, to other circuits where SR MOSFETs or other switching devices are used.

Figure 1A:
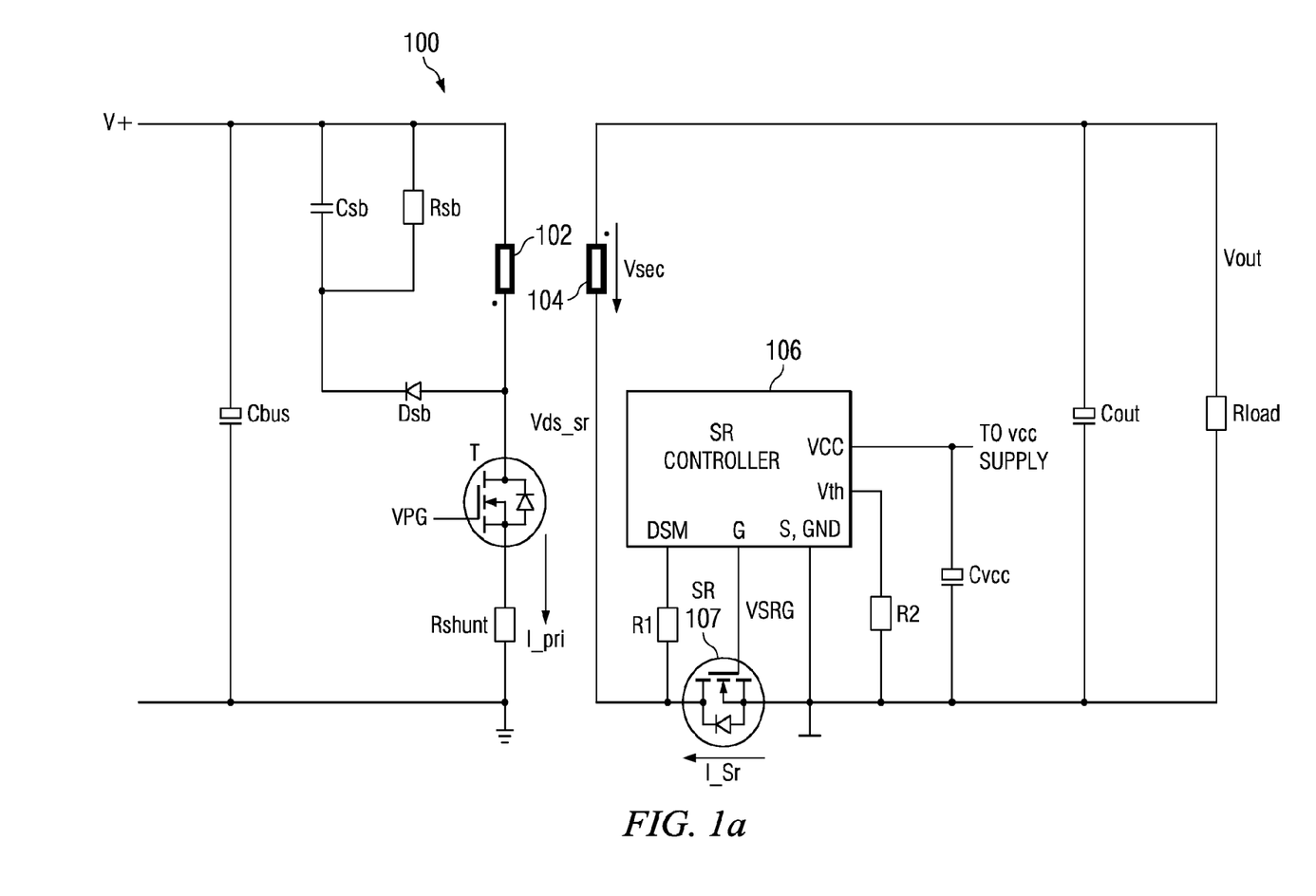
FIG. 1a illustrates a simplified circuit schematic for a flyback power converter incorporating features of the invention.

FIG. 1 shows an exemplary power converter circuit in a flyback configuration incorporating the features of embodiments of the present invention. In FIG. 1, a transformer of primary side coil 102 and secondary side coil 104 is depicted. A primary control circuit pulse width modulator (not shown) drives gate voltage VPG for a primary switch T; here an exemplary MOSFET transistor T is shown. Other switching devices such as IGBTs may be used. Input voltage V+ is coupled to primary side coil 102, and output voltage VOUT is coupled to secondary coil 104.

In preferred embodiments of the present invention, a snubber circuit made of capacitor Csb, resistor Rsb and diode Dsb is included. The snubber circuit prevents large voltage transients at the drain of transistor T from occurring immediately after transistor T is switched off. Csb is preferably between about 20 nF and 30 nF, and Rsb is preferably between about 10 KΩ and 30 KΩ. In alternative embodiments, other values and/or snubber architectures may be used, or the snubber may be omitted.

Rshunt can be used to measure current I_pri on the primary side of the power supply. Rshunt is preferably less than 1Ω in order to minimize power dissipation; however, in alternative embodiments of the present invention, Rshunt may be larger if the design permits, or may be eliminated. Capacitor Cbus is used to lowpass filter and smooth input V+, and is preferably implemented as an electrolytic capacitor with a value between about 10 μF and about 100 μF. In alternative embodiments, other capacitor types and values can be used according to the application.

In preferred embodiments of the present invention, transistor SR is coupled to secondary coil 104 and is driven by SR controller 106 driving voltage VSRG at the gate of transistor SR. Transistor SR is preferably a MOSFET, but other types of devices may be used in alternative embodiments, for example, a bipolar transistor with an anti-parallel connected diode. Transistor SR is depicted with body diode 107 that becomes conductive whenever MOSFET SR is disabled and current I_sr is flowing from the source to the drain forward biasing the diode. Resistor R1 is coupled to the drain of MOSFET SR to limit current to voltage sense input DSM of SR controller 106. Sense input DSM is coupled to circuitry in the SR controller 106 that senses the drain voltage of MOSFET SR. Resistor R1 is preferably between about 2 KΩ and about 50 KΩ in order to limit current to SR controller 106. In alternative embodiments of the present invention, other sensing schemes may be used besides the drain voltage-sensing scheme shown in FIG. 1a, for example, series current sensing resistors. In further embodiments of the present invention, Resistor R1 may assume other values or may be omitted if the application or IC technology warrants.

Rload is representative of the power supply load; however, in some embodiments of the present invention, a shunt resistor may be included within the power supply at VOUT in order to maintain adequate biasing in low load conditions.

Resistor R2 is provided to preset the thresholds for entering and leaving standby mode operation of the SR controller. In this configuration, once the resistance is fixed, the thresholds are fixed as well. In alternative embodiments, resistor R2 can be replaced by a resistor-switch network so that the thresholds can be changed during operation. Cvcc is preferably included to decouple the power supply of SR Controller 106, and capacitor Cout is included to lowpass filter the output of power supply 100. Capacitor Cout is preferably between about 100 μF and about 2000 μF depending on the application; however other values may be used.

Figure 1B:
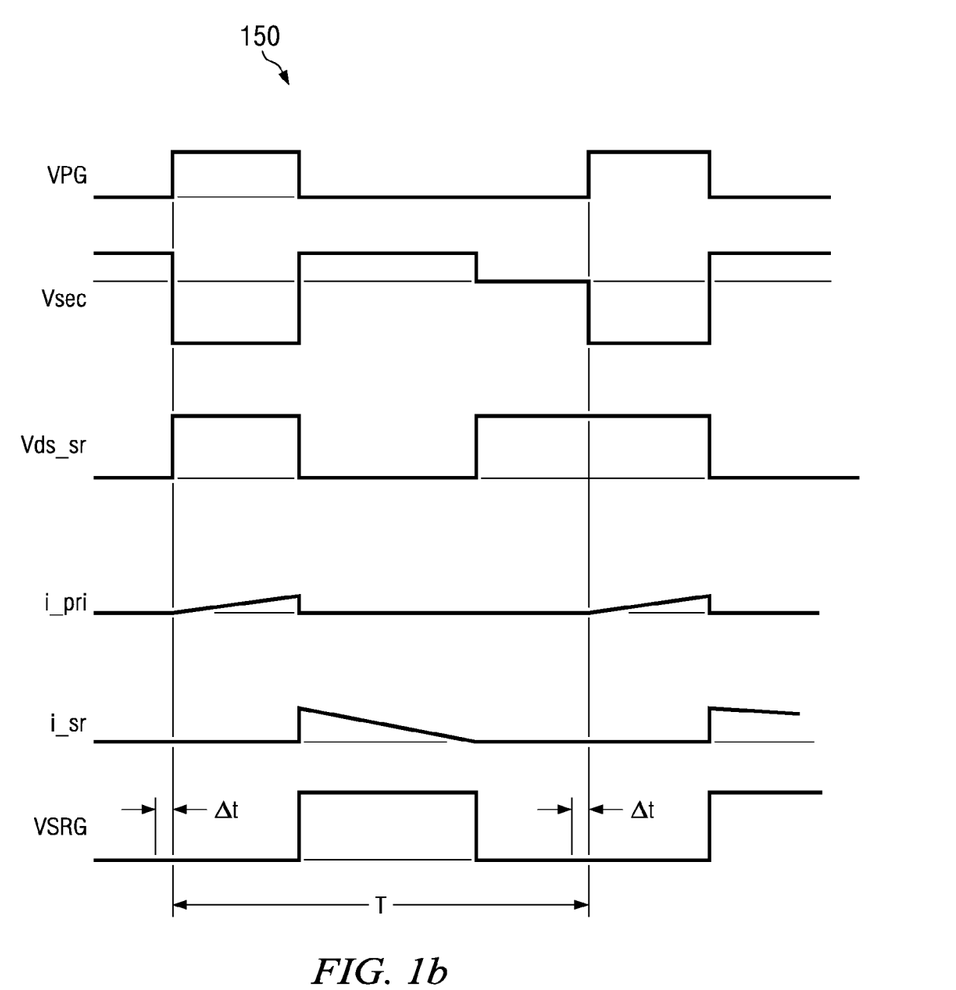

FIG. 1b shows a timing and waveform diagram that illustrates the discontinuous conduction mode (DCM) operation of flyback converter 100 shown in FIG. 1a. VPG represents the gate voltage of transistor T coupled to primary coil 102, Vsec represents the voltage across secondary coil 104, Vds_sr represents the drain-source voltage of transistor SR, I_pri represents the current though primary coil 102, I_sr represents the drain current of transistor SR, and VSRG represents the gate voltage of transistor SR.

At the beginning of primary conduction cycle T, gate voltage VPG of primary side transistor T is driven to a voltage sufficient to turn on transistor T and cause current I_pri to begin conduct through primary coil 102, while the gate voltage VSRG of transistor SR is driven to a voltage that shuts off transistor SR. As current I_pri increases due to the inductive effect of the primary coil, voltage Vsec across the secondary coil assumes a negative voltage, and voltage Vds_sr is developed at the drain of transistor SR.

Once a sufficient current is developed in primary coil 102, transistor T is shut off by driving gate voltage VPG to a voltage that corresponds to a non-conductive state of transistor T, and transistor SR on the secondary side of the power supply is turned on by driving gate voltage VSRG to a voltage that corresponds to a conductive state of transistor SR. Conventional and known techniques can be used to determine when transistor SR is switched on. When transistor SR switching on, current I_sr conducts through transistor SR and secondary coil 104, thereby supplying current to load Rload and/or charging capacitor Cout.

Once secondary current I_sr reaches a very small value or zero, then transistor SR is shut off in order to prevent reverse current flow from Cout back through the drain of transistor SR. One possible technique to determine when transistor SR should be shut off after the secondary coil has stopped forward conduction is described in commonly assigned patent application Ser. No. 12/111,273, filed Apr. 29, 2008, entitled "Synchronous Rectifier Control Circuit and Method," which application is hereby incorporated herein by reference.

Besides being operated in DCM as is shown in FIG. 1b, flyback converter 100 (FIG. 1a) can also be operated in continuous conduction mode (CCM). In CCM, gate voltage VPG or primary transistor T is driven to a voltage that causes transistor T to conduct after the channel of transistor SR stops conducting. In preferred embodiments of the present invention, gate voltage VSRG of transistor SR is driven low for a time Δt prior to transistor T being turned on in order to avoid simultaneous conduction of both transistor T and transistor SR. In preferred embodiments of the present invention, Δt is preferably about 100 ns, however, in alternative embodiments, this time may be different depending on the application.

It should be noted that in some embodiments of the present invention, power supply 100 could be operated in both DCM and CCM depending on the application and the output load. For example, CCM can be used in high current load conditions and DCM can be used in low current load conditions. DCM provides a more power efficient scheme for lower output loads because neither the primary nor the secondary side is conducting during the last interval of primary conduction cycle T.

Under moderate to heavy load conditions, activating transistor SR during the secondary conduction time is more power efficient than if a diode were used. The reason for this is that the power dissipated in a forward biased diode (i.e. 700 mV diode drop) during the secondary conduction time would dissipate more power than transistor SR (i.e. 100 mV source-drain voltage) would under similar conditions. Under lightly loaded conditions where the switching power supply is being operated at high frequencies, for example, over 50 KHz, switching losses due to charging and discharging the gate capacitance of the SR transistor may actually exceed the power losses of a corresponding series diode. In these lightly loaded conditions, it is more power efficient to keep transistor SR turned off during the secondary conduction period and, instead, rely on the conduction of body diode 107 (see FIG. 1a).

In preferred embodiments of the present invention, transistor SR is deactivated when the secondary conduction current is less than a predefined threshold. This secondary conduction current is detected by comparing the secondary conduction time (i.e., the time during which the secondary coil is conducting current and the source drain voltage of transistor SR is at a minimum) with the converter switching period T. If the ratio of the secondary conduction time to the converter switching period T is less than a preset threshold, then MOSFET SR is deactivated.

In preferred embodiments of the present invention, the drain voltage of transistor SR is monitored by SR controller 106 (FIG. 1a) by comparing the voltage at interface DSM with a threshold voltage, preferably between about 200 mV and 500 mV. During times of SR transistor operation, a voltage less than this threshold indicates that the SR transistor and secondary coil 104 is conducting current, while a voltage in excess of this threshold indicates that the SR transistor and secondary coil is not conducting current. During times when the SR transistor is disabled and body diode 107 of the SR transistor is being used as a switch, the same threshold can be used in order to indicate that body diode 107, hence secondary coil 104 is conducting. Detection of the voltage at DSM is preferably performed by a comparator. In alternative embodiments of the present invention, other threshold values and different detection schemes may be implemented.

Figure 2A:
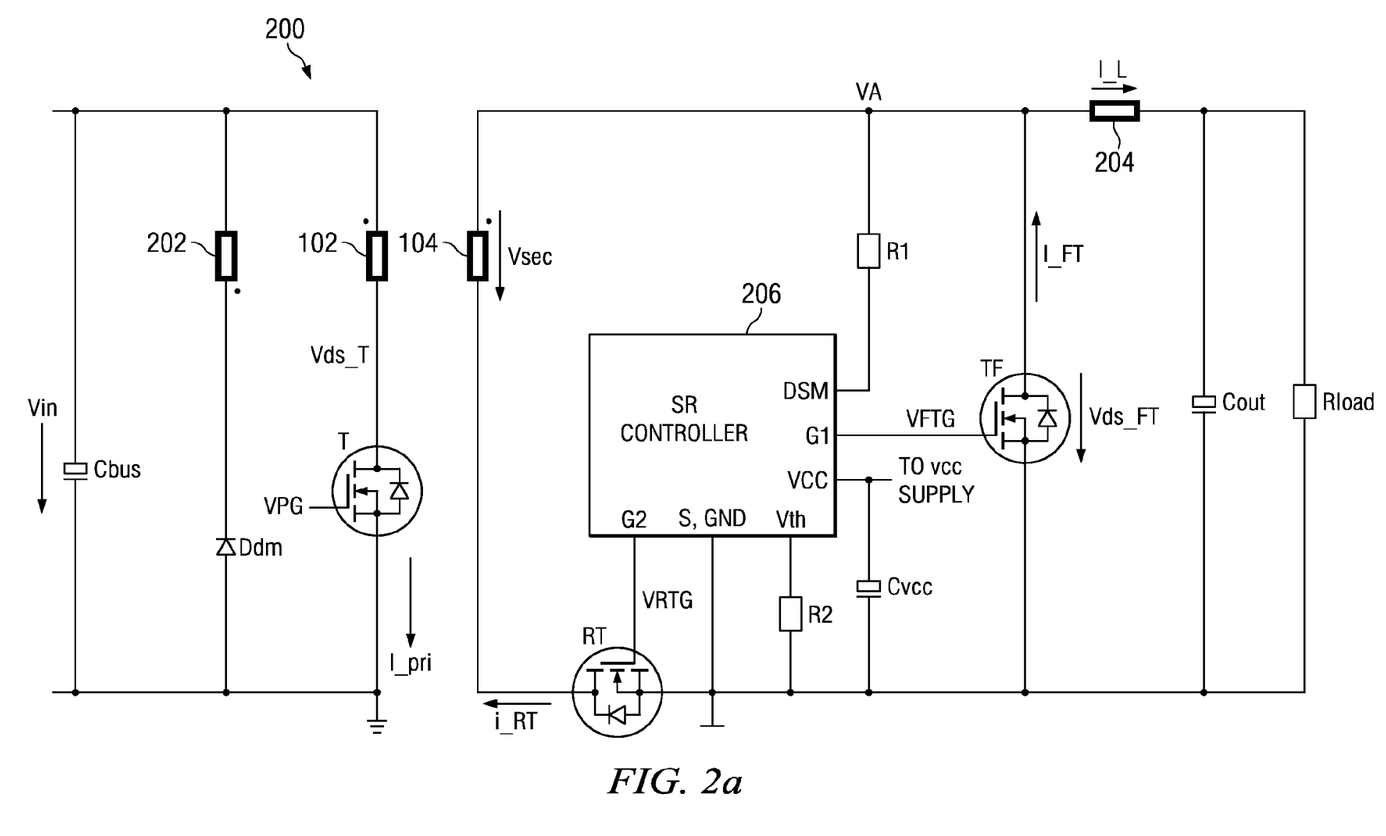
FIG. 2a illustrates a simplified circuit schematic for a forward power converter incorporating features of the invention.

Turning to FIG. 2a, a schematic diagram 200 showing a forward converter made according to an embodiment of the present invention is shown. The forward converter is similar to the flyback converter shown in FIG. 1a, with the addition of a third winding 202 magnetically coupled to the primary winding 102 and the secondary winding 104. In addition, a series inductor 204 is placed in series with the output capacitor Cout and load resistance Rload, and freewheeling MOSFET FT is coupled with its source to ground, its drain to secondary winding 104 and its gate to controller 206. Forward converters are known in the art to produce a lower ripple output because of the lowpass filter formed by series inductor 204 and output capacitor Cout. In preferred embodiments of the present invention that incorporate the forward converter architecture, secondary current sensing is achieved by monitoring the voltage at node VA, which is coupled to the secondary coil 104 and series inductor 204. R1 has a value of between about 2 KΩ and about 50 KΩ, and is preferably provided to limit the effect of current transients on controller 206.

Figure 2B:
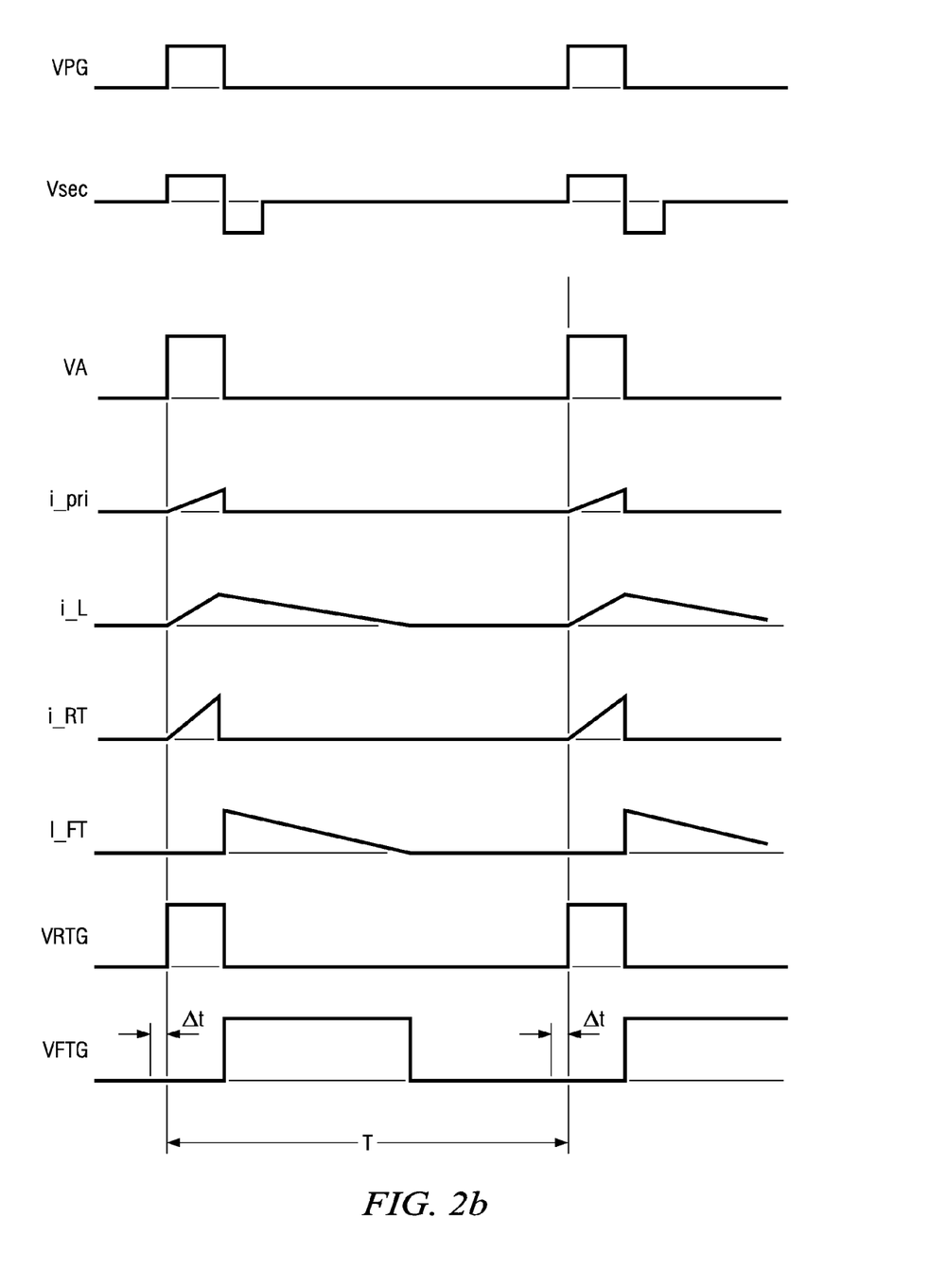

FIG. 2b illustrates a series of waveform diagrams showing the operation of the forward converter depicted in FIG. 2a in a discontinuous conduction mode. VPG represents the voltage at the gate of transistor T, Vsec represents the voltage across secondary coil 104, VA represents the drain-source voltage of transistor FT, I_pri represents the current through primary coil 102, I_L represents the current though series inductor 204, I_FT represents the drain current of freewheeling transistor FT, I_RT represents the drain current of transistor RT, VRTG represents the gate voltage of transistor RT, and VFTG represents the gate voltage of freewheeling transistor FT.

When VPG at the gate of transistor T on the primary side goes high, current starts to flow in primary winding 102. VRTG goes high causing transistor RT to conduct current induced from the primary coil through secondary winding 104, and freewheeling transistor FT is shut off as gate voltage VFTG is low. As the primary transistor T and rectifying transistor RT continue to conduct, the currents I_pri though primary winding 102 and I_L though series inductor 204 increase linearly with time. I_RT is approximately equal to I_L, node VA assumes a positive potential, and voltage Vsec across the secondary coil assumes a positive voltage approximately equal to VA.

At the end of the primary coil charging time, VPG goes low and shuts off primary side transistor T. Node VFTG at the gate of freewheeling transistor FT is driven high, and node VRTG at the gate of transistor RT is driven low, shutting off the SR transistor RT and allowing a current conduction path through freewheeling transistor FT, inductor 204, and out to load Rload and output shunt capacitor Cout. Current induced by magnetic coupling between primary coil 102 and third coil 202 begins to flow though diode Ddm and third coil 202. Current I_FT though transistor FT and secondary winding 104 decreases linearly with time until the current reaches zero, at which time transistor FT is shut off to prevent reverse current flow from the load back through the power supply.

Control of transistors T, RT and FT can be accomplished according to known methods as described hereinabove. Forward converter 200 (FIG. 2a) can also be operated in continuous conduction (CCM) mode.

Figure 3:
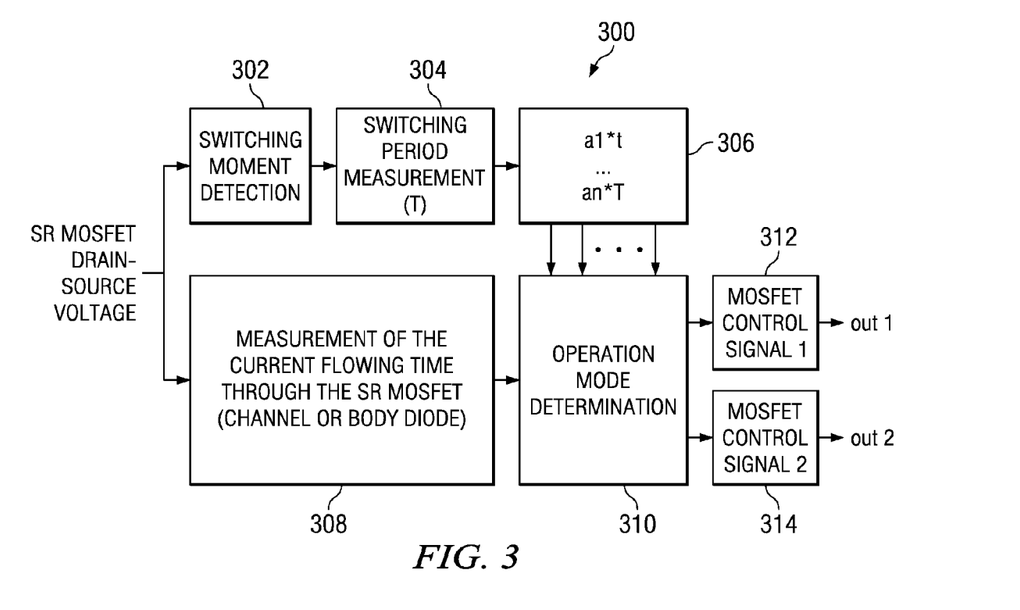
FIG. 3 illustrates a block diagram describing the operation of an embodiment of the present invention.

Turning to FIG. 3, block diagram 300 of an embodiment detection method is shown. In preferred embodiments of the present invention, the determination on whether or not to activate transistor SR is determined by monitoring the drain-source voltage of transistor SR. As can be seen by the waveform in FIG. 1b, drain-source voltage Vds_sr is periodic with a period corresponding to primary switching period T. Block 302 detects the rising and/or falling edges of Vds_sr and block 304 performs a switching period measurement that determines switching period measurement (T). In preferred embodiments of the present invention switching moment detection 302 and switching period measurement (T) is performed in the digital domain using techniques know in the art. For example, block 302 can be implemented using latches and/or registers, and the switching period measurement can be implemented using a digital counter. In alternative embodiments of the present invention, other techniques for deriving the switching period measurement can also be used. For example, switchable current sources can be used for switching moment detection 302 and an analog integrator can be used to determine the switching period measurement (T).

In block 308, a measurement is made of the current flowing through the secondary coil 104 (FIG. 1a). In preferred embodiments of the present invention, this measurement is made by determining how long the current I_sr is flowing though transistor SR or through body diode 107 (FIG. 1a). In the embodiment shown in FIG. 1b, this period of time corresponds to the time that the drain-source voltage of transistor SR is at a minimum. It should be noted that in alternative embodiments of the present invention, other current sensing schemes may be used and/or other voltages within the secondary side of the power supply can be monitored to determine the secondary current conduction period. For example, current can be sensed through a shunt resistor or current transformer. In preferred embodiments, block 308 is implemented digitally, preferably using digital counters, however, in alternative embodiments, other techniques can be used, such as analog timer made from a current source and capacitor together with comparator, where the voltage across the capacitor, developed by integrating current, contains elapsed time information.

In block 306, switching period measurement (T) is scaled for comparison with the secondary current conduction time derived by block 308. If the detection method is being performed in the digital domain, this scaling can be performed digitally using multipliers and/or shift registers, for example. If the detection method is implemented in the analog domain, then this scaling can be performed in the analog domain using known methods such as current or voltage dividers. In the embodiment shown in FIG. 3, multiple scaled values are calculated. In preferred embodiments of the present invention, at least two scaled values are preferable calculated: a first value that corresponds to a lower threshold (a1*T) and a second value that corresponds to a higher threshold (a2*T). These scaled switching period measurements are compared with the secondary current conduction time, and a determination is made whether or not to activate transistor SR based on this comparison. Results of these determinations are routed to control block 312 that controls transistor FT via control signal out1. In other embodiments of the present invention, other transistors can be controlled with further control signals. For example, block 314 could provide control signal out2 to a transistor RT of a forward converter as is discussed hereinbelow.

Figure 4:
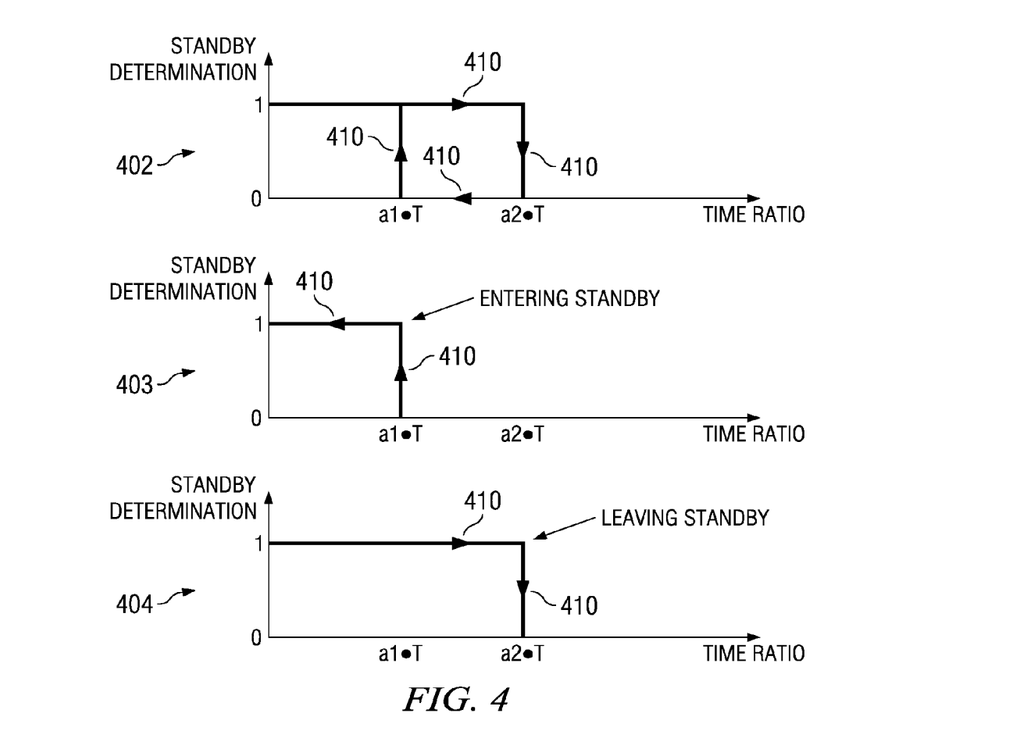
FIG. 4 illustrates timing diagrams of an embodiment of the present invention.

FIG. 4 illustrates the operation of block 310 (FIG. 3) for a preferred embodiment of the present invention. Threshold diagrams 402, 403 and 404 show the relationship between thresholds a1*T and a2*T and an input time ratio on the horizontal axis. The vertical access represents the result of a standby mode determination, where a standby mode determination of "1" corresponds to the deactivation of transistor SR and a standby determination of "0" corresponds to transistor SR being activated. In alternative embodiments of the present invention, other coding and determination schemes can be used.

In preferred embodiments of the present invention, standby mode determinations are determined with hysteresis, as is indicated by arrows 410 in graph 402. When the time ratio (or secondary conduction time) is less than first threshold a1*T, the standby mode is activated and transistor SR is deactivated as is shown in diagram 403. The power converter will remain in standby mode until the time ratio (secondary conduction time) exceeds a2*T as is shown in diagram 404.

In preferred embodiments of the present invention, the products represented by a1*T and a2*T are programmable and each represent a ratio of less than 100% of T. For example, under one section regime, a1*T represents a 6.25% ratio and a2*T represents a 12.5% ratio. This means that whenever the secondary conduction time is less than 6.25% of the primary switching period T, the standby mode is activated and transistor SR is not activated. Once the standby mode has been activated, however, the standby mode will remain active until the secondary conduction time exceeds 12.5%.

Figure 7:
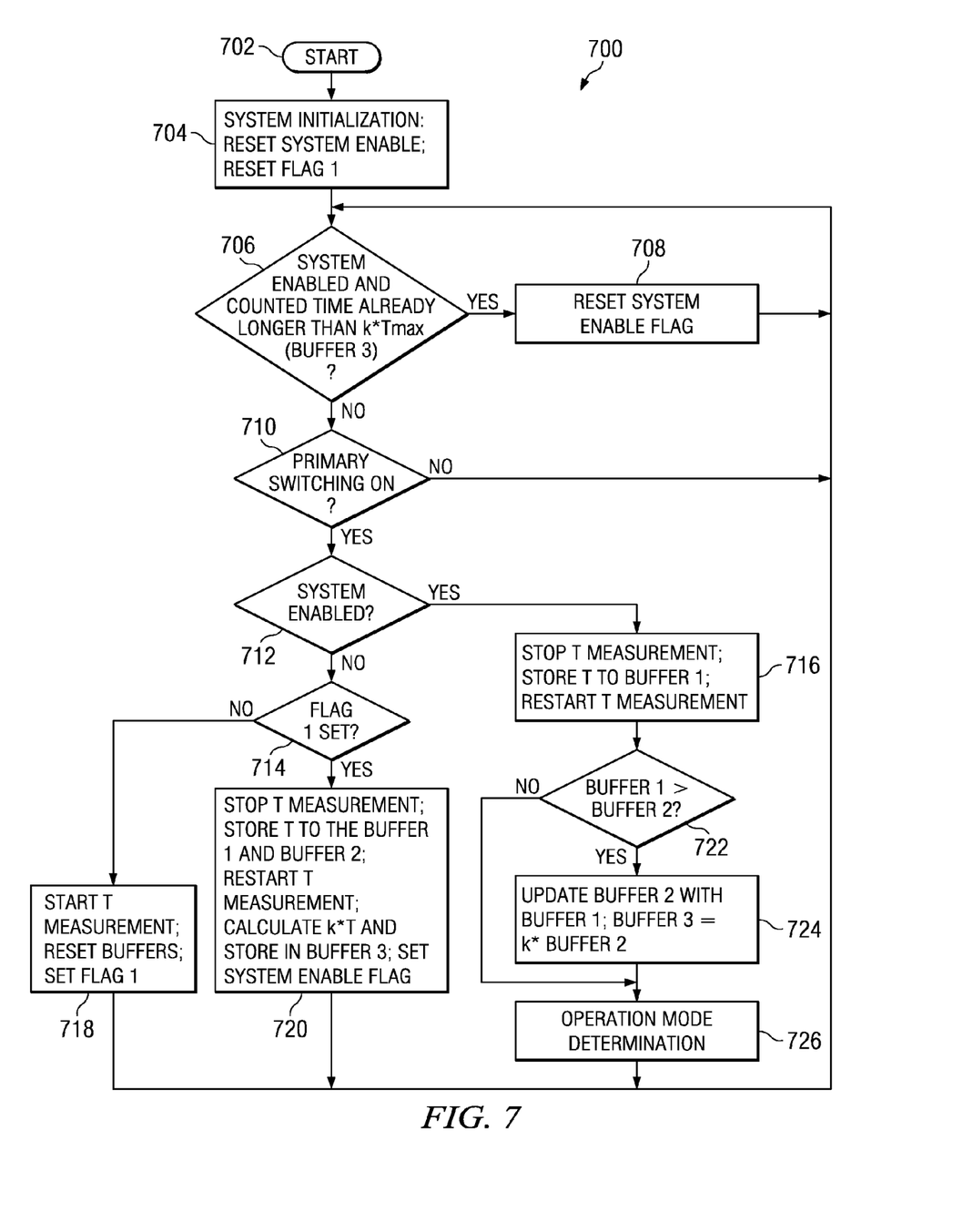
FIG. 7 illustrates a flow chart describing an embodiment switching period measurement mechanism of a converter with burst mode operation.
Figure 8:
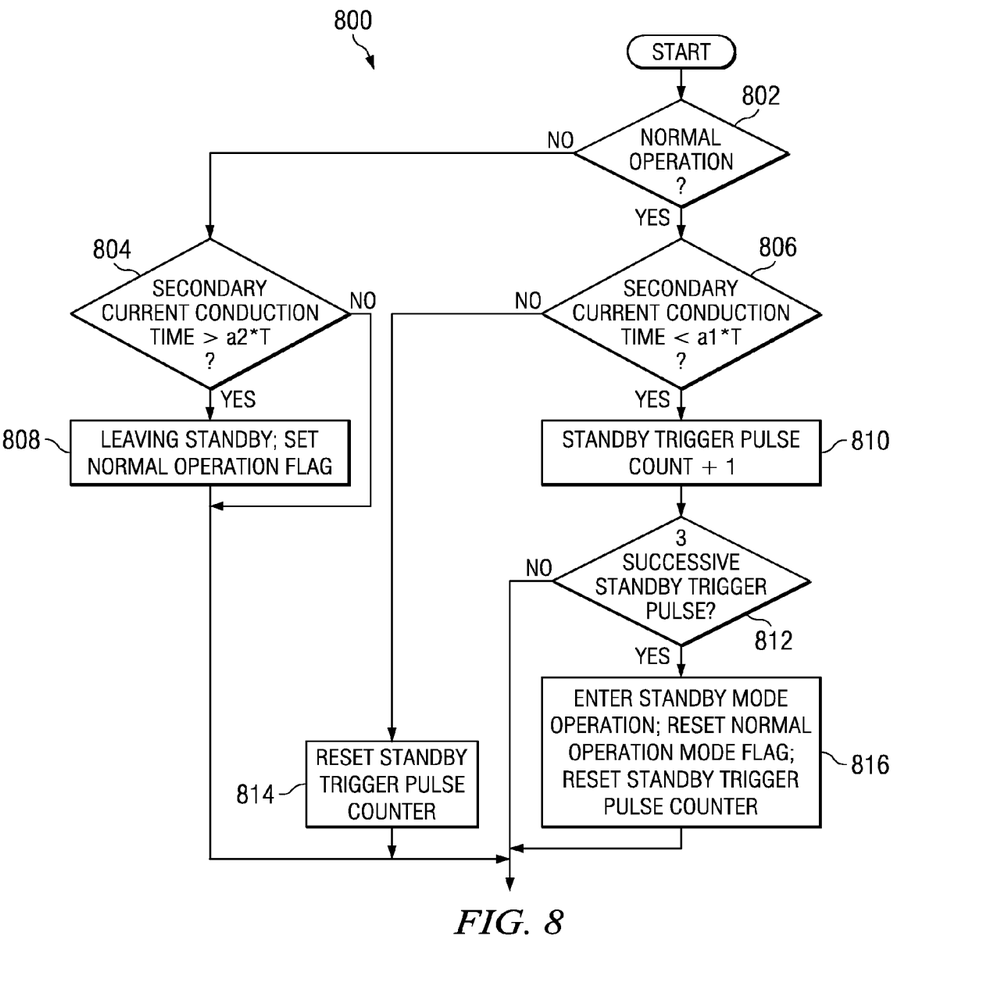
FIG. 8 illustrates a flow chart describing standby mode determination of an embodiment of the present invention.

FIG. 8 illustrates a flowchart of a method of making a standby mode determination according to an embodiment of the present invention. This method is executed in every switching cycle than an operation mode is being determined in block 310 of FIG. 3 and block 726 of FIG. 7 as described hereinbelow. In step 802, a determination is made whether the system is a normal operation mode, the normal operating mode being the mode in which the SR transistors are switching. If the system is in normal operation mode, step 806 determines if the secondary current conduction time is less than a1*T. If the secondary current conduction time is less than a1*T, then a standby trigger pulse counter is incremented in step 810 and the system advances to step 812. If three successive pulses are detected in step 812, then standby operation mode is entered, a normal operation flag is reset and the standby trigger pulse counter is reset in step 816. Going back to step 806, if the secondary conduction time is not less than a1*T, the standby trigger pulse counter is reset.

In step 802, if the system is not in normal operation, the method advances to step 804 where the secondary current conduction time is compared to a2*T (which is greater than a1*T as described hereinabove). If the secondary side current conduction time is greater than a2*T, then the standby mode is exited, and the normal mode is entered by setting a normal operation flag in step 808. If the secondary side current conduction time is not greater than a2*T, then the system remains in standby mode. This kind of control for entering and leaving standby mode control ensures efficient operation of the SR MOSFETs.

Figure 5A:
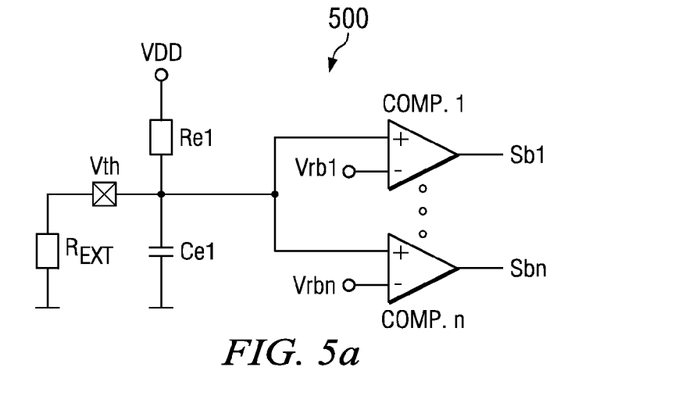
FIGS. 5a-5c illustrate a graph and table describing threshold operation of an embodiment of the present invention.
Figure 5B:
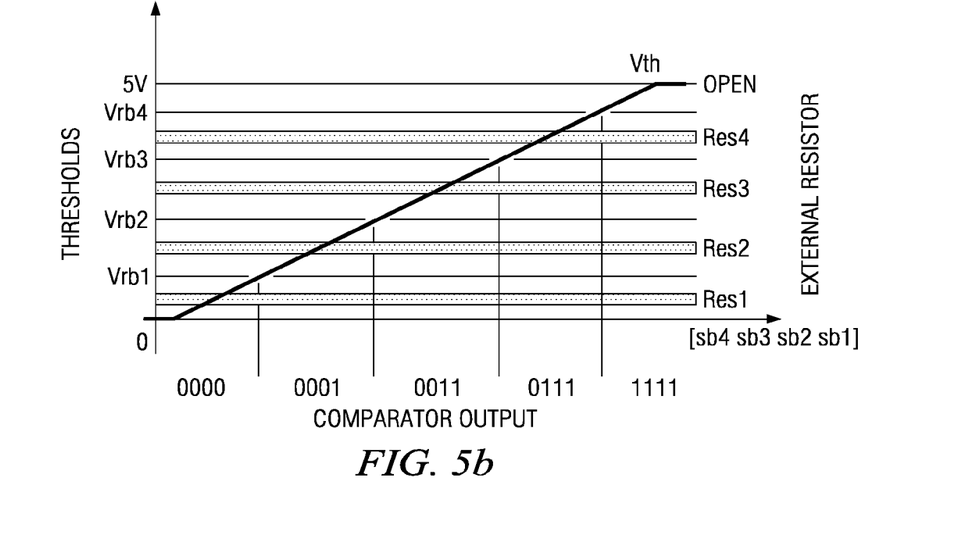
Figure 5C:
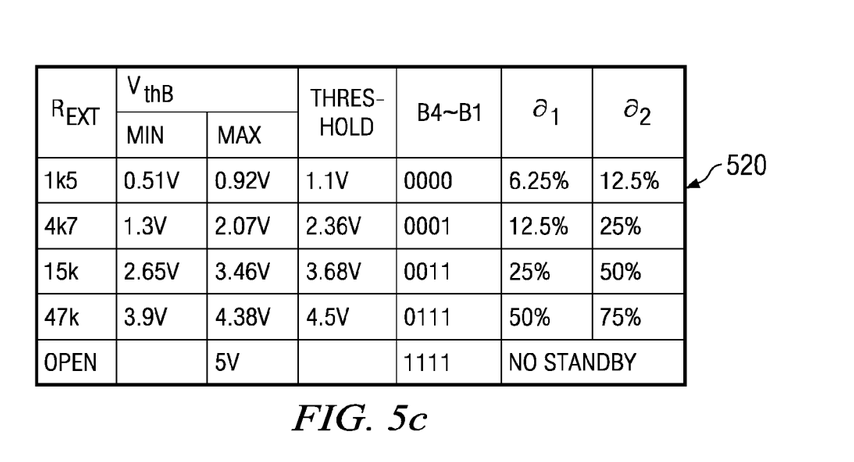

FIGS. 5a-5c illustrate an embodiment of the present invention that provides for selectable thresholds a1*T and a2*T. In this embodiment, external resistor REXT is used to select a pair of thresholds as is shown in FIG. 5a. In preferred embodiments of the present invention, and internal resistor Re1 is coupled to VDD and external pin Vth. The voltage at Vth is determined by a voltage divider made up of resistors Re1 and REXT so that Vth=VDD*(REXT/(REXT+Re1)). Vth is compared to threshold voltages Vrb1 though Vrbn using comparators Comp1 though Compn to generate output signs Sb1 through Sbn. The number of thresholds and comparators are determined according to the application. In preferred embodiments, however, four thresholds and four corresponding comparators are used.

FIG. 5b shows a graph of comparator output v. comparator thresholds and external resistors. Voltage Vth is represented by the diagonal line on the graph. Comparator outputs Sb4 Sb3, Sb2 and Sb1 are represented by the 4-bit words on the horizontal axis of the graph, where Sb4, or the output of the fourth comparator, is the most significant bit. If Vth is less than Vrb1, all comparators outputs low or in a 0000 state. When Vth exceeds Vrb1, Sb1 goes high and the comparators achieve a 0001 state. When Vth exceeds all thresholds, a 1111 state is achieved. In alternative embodiments of the present invention, other selection schemes may be used, such as laser trimming or storing threshold values in non-volatile memory. Furthermore, alternative coding schemes may be used in other embodiments.

FIG. 5c shows a table 520 of external resistors (REXT) threshold ranges Vth (min and max), preset thresholds, comparator outputs, and resulting selectable preset thresholds a1*T and a1*T. Table 520 assumes a value of Re1 of about 5 KΩ and a VDD voltage of about 5V. For this embodiment, device tolerances of +/−20% for the internal resistor and +/−10% for the external resistor are assumed, while the variation of the VDD voltage assumed to be negligible. Time ratio pairs can be selected as 6.25% and 12.5%, 12.5% and 25%, 25% and 50%, 50% and 75%, or no standby if pin Vth is left open. This selection scheme is well suited for general-purpose power supply controller because it gives the potential end-user the flexibility to program the selection thresholds according to a particular application. It should be appreciated that in alternative embodiments of the present invention, other time ratios may be selected and other techniques may be used for the selection. It should also be noted that different applications and processes may dictate different assumptions for device and power supply tolerances.

Figure 6:
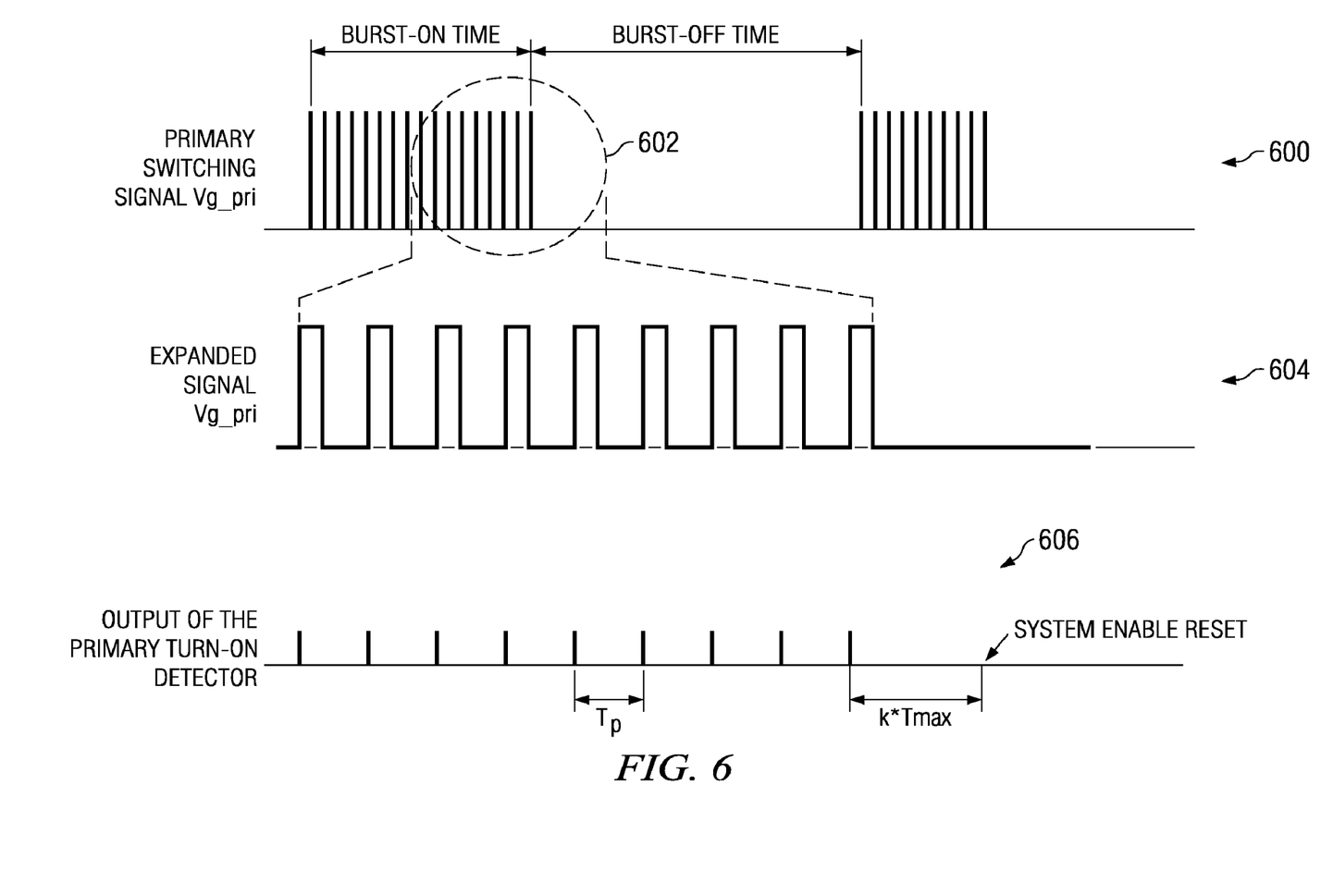
FIG. 6 illustrates waveforms corresponding to an embodiment switching period measurement mechanism of a converter with burst mode operation.

FIG. 6 shows a waveform diagram that illustrates a switching period measurement mechanism of a converter with burst mode operation determined by the primary controller according to a preferred embodiment of the present invention. To minimize input power during light load, the primary side controller may enter burst mode operation. During burst-mode operation, the primary side switch has a burst-on time, where the primary side switch cycles (as in normal operation) and energy is transferred from the primary side to the secondary side, and a burst-off time, where no switching happens. In this way, the average input power is minimized for light loads. For efficient operation of the SR controller in a power converter with a burst mode operation, it is, therefore, necessary to distinguish between the end of a normal non-burst mode switching period the onset of a much longer burst-off time.

Waveform 600 illustrates a primary switching signal Vg_pri that corresponds to a primary switch control signal in a switch mode power supply during burst mode operation. In some embodiments of the present invention, Vg_pri corresponds to a gate drive voltage of a primary side transistor. During the burst-on time, the primary switching signal is active, and during the burst-off time, the primary switching signal Vg_pri is inactive. Waveform 604 is an expanded view of the circled pulses 602 from waveform 600, and waveform 606 is an output of a primary turn-on detector which is included in Switching period Measurement block 304 in FIG. 3. In preferred embodiments of the present invention, the primary turn-on detector detects the switching moment of the primary side switch and generates a pulse at the moment that the primary side switch is turned on. As can be seen by waveform 606, a system enable signal, which enables the switching action of the SR transistors during operation, is reset if the counter running time exceeds k*Tmax, where T represents a primary cycle interval, Tmax represents the maximum of recorded primary cycle interval. In a power converter system with a constant switching frequency, Tmax is principally equivalent to T. In the case of a power converter with variable switching frequency, however, Tmax is the maximum of the measured switching period. The quantity k*Tmax represents a threshold value that is relative to the maximum primary cycle interval. Once the counted time in the actual cycle is longer than the set time threshold, k*Tmax, the SR controller system enable flag is reset and the SR MOSFET is kept off. After the long burst-off time, the SR controller begins with a new procedure for switching period measurement and obtains accurate information about the switching period after the beginning of the next burst-on for the standby determination of the SR controller again.

FIG. 7 shows a flowchart illustrating the operation for the switching period measurement suitable for a converter with burst mode operation controlled by the primary side controller that can handle either a constant or a variable switching frequency. The system starts at block 702. In block 704, the system is initialized, the system enable flag, which indicates that the SR control is ready for operation when it is set, is reset and flag 1 indicating the first time switching period measurement is reset, as well. Block 706 determines whether the system is enabled and whether the counted time since the last detected primary turn-on pulse is already longer than time threshold k*Tmax. If the counted time is greater than k*Tmax and the system is enabled, then the system enable flag is reset and block 706 is evaluated again.

If the system is not enabled or the counted time has not exceeded k*Tmax, then the operation proceeds to block 710 where a determination is made whether or not the primary switching turn-on is detected. If no signal of the primary switch turn-on is available, block 706 is evaluated again, but if primary switch turn-on signal is detected, a determination is made whether the system is enabled in block 712. If the system is not yet enabled, then flag 1 is checked in block 714. If flag 1 is not set, then a measurement of T is started, all buffers are reset, and flag 1 is set indicating that it is the first time of the switching period measurement. If block 714 detects that flag 1 is set, however, a measurement of T is stopped, the value of T is stored into buffer 1 and buffer 2, T measurement is restarted; k*T is calculated and stored in buffer 3 and the system enable flag is set.

If block 712 detects that the system is enabled, then block 716 stops the T measurement and stores T to buffer 1, then restarts the T measurement. If the contents of buffer 1 are greater than the contents of buffer 2, according to block 722, buffer 2 is updated with the contents of buffer 1. At the same time, the buffer 3 is updated with k-times of the value in buffer 2. An operation mode determination is then performed in block 726, and block 706 is once again evaluated. In preferred embodiments of the present invention, the operation mode determination proceeds according to the flowchart in FIG. 8 described hereinabove. In this embodiment, buffer 1 contains information about the newly measured switching period, buffer 2 contains the measured longest switching period, and buffer 3 contains k-times of the measured maximal switching period. In alternative embodiments of the present invention, other techniques can be used to detect the presence or absence of a burst-mode, and accordingly to get the accurate information about the switching period for the SR operation mode determination.

Essentially, the method illustrated in FIG. 7 detects the onset of the burst-off and then suspends the operation of the detection system that measures the secondary side current and determines whether to activate SR transistor switching. Once the burst-off period has ended, the detection system initializes then determines whether to activate SR transistor switching. In alternative embodiments of the present invention, the SR transistor can be shut off when the counted time is longer than k*Tmax, then activated when the next primary turn-on cycle is detected. This alternative technique allows for SR transistor switching to occur at the onset of a burst-on period without waiting for the detection system to initialize.

Figure 9:
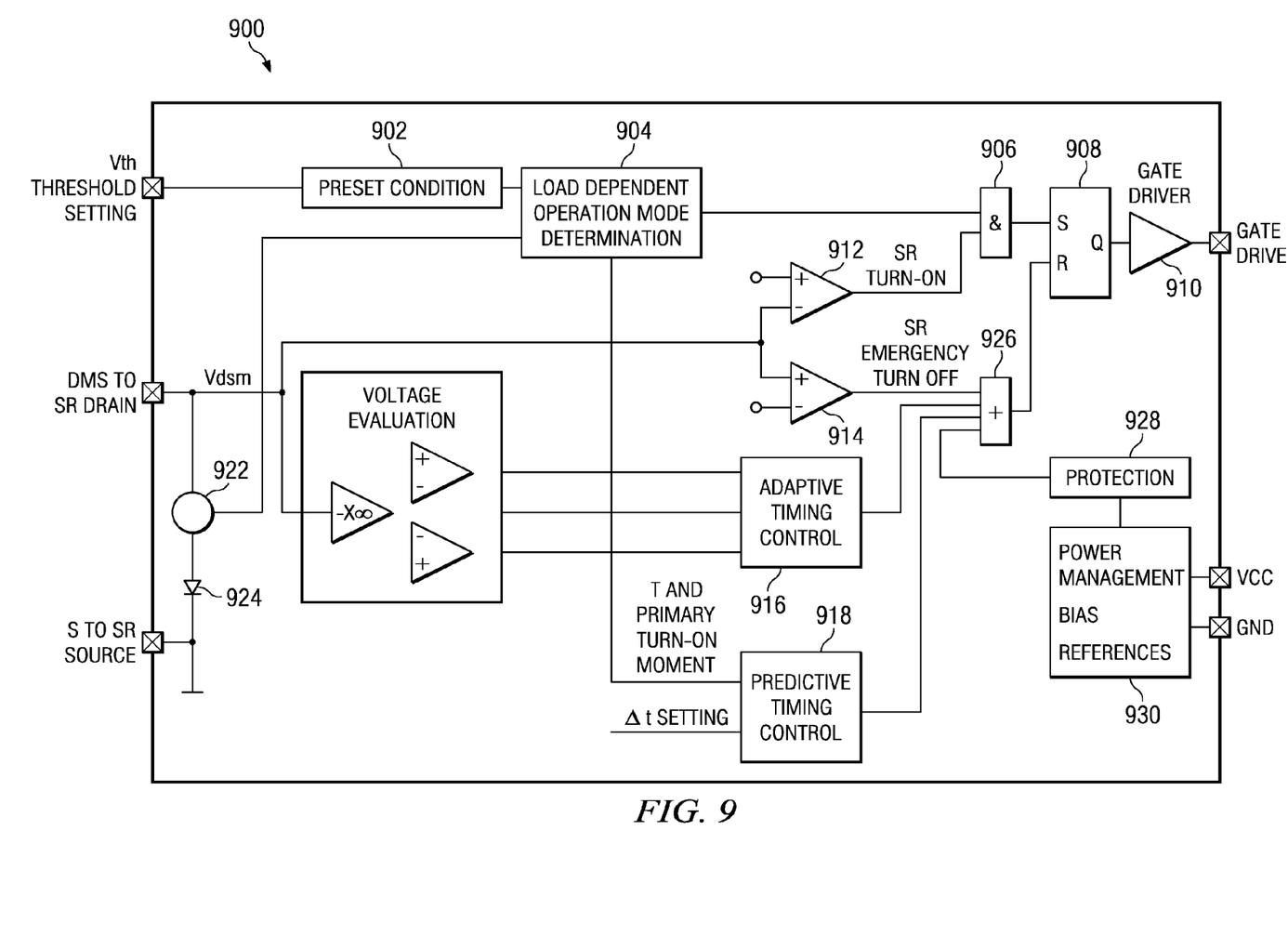
FIG. 9 illustrates a block diagram of an integrated circuit incorporating an embodiment of the present invention.

Turning to FIG. 9, a block diagram of integrated circuit 900 that incorporates embodiments of the present invention is illustrated. Integrated circuit 900 has a gate driver 910 configured to drive the gate of an SR MOSFET device. Gate driver 910 is driven by SR latch 908. SR latch 908 is set when comparator 912 detects the falling edge of pin DSM, which senses the drain voltage of the synchronous rectifier (SR) transistor, together with an output of a load dependent operation mode algorithm 904. An example embodiment of the load dependent operation mode determination according to the present invention is illustrated in FIG. 8 and is described hereinabove. Load dependent operation mode determination is coupled to the DSM pin through the current monitoring block 922 for primary switching moment detection and secondary side current flowing time measurement. Alternatively, a voltage monitoring circuit can also be used for this purpose. Additionally, the Load dependent operation mode determination is coupled to the output of preset condition block 902. An embodiment of preset condition block 902 is illustrated in FIGS. 5a-5c and described hereinabove.

The gate driver can be reset (or disabled) by way of an emergency turn-off function that is activated when the SR transistor gate voltage at pin DSM exceeds a threshold voltage. The gate driver can also be reset by adaptive timing control block 916 activated during DCM mode, by predictive timing control block 918 in CCM mode, or the gate driver can be reset by a protection circuit 928 coupled to power management circuit 930.

Predictive timing control block 918 has as inputs the measured T and the pulse at turn-on moment of the primary side switch generated by load dependent operation mode determination block 904. A Δt setting that can be internally fixed or generated from other signals or stored in a programmable memory cell residing on integrated circuit 900 is also input to block 918. Using predictive timing control 918, overlap of the primary and secondary switches is avoided. Though a stand alone IC is illustrated here, alternative embodiments may consist of an integrated solution without the control IC and a switch.

Although the present invention and its advantages have been described in detail, it should be understood that various changes, substitutions and alterations could be made herein without departing from the spirit and scope of the invention as defined by the appended claims. For example, although differential operational amplifier circuits are shown in some embodiments, known circuit design alternatives could be used to implement the functions.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controlling a synchronous rectifier (SR), comprising:
    providing an SR transistor having a source terminal, a drain terminal and a gate terminal, wherein a drain to source current conduction path of the SR transistor is coupled between a secondary coil of a transformer and a first voltage output terminal, a second voltage output terminal is coupled to the secondary coil, and an output capacitor is coupled across first and second voltage output terminals;
    monitoring a drain to source voltage across the SR transistor;
    determining a secondary current conduction time based on monitoring the drain to source voltage;
    monitoring a primary switching period of a source coupled to a primary coil, the primary coil magnetically coupled to the secondary coil;
    determining a ratio of a secondary conduction time to the primary switching period;
    comparing the ratio to a first predetermined threshold; and
    disabling the SR transistor if the predetermined threshold is greater than the ratio.

2. The method of claim 1, wherein comparing the ratio comprises comparing the ratio to the first predetermined threshold if the SR transistor is enabled.

3. The method of claim 2, further comprising:
    comparing the ratio to a second predetermined threshold if the SR transistor is disabled, wherein the second predetermined threshold is greater than the first predetermined threshold; and
    enabling the SR transistor if the SR transistor is disabled and if the ratio is greater than the second predetermined threshold.

4. The method of claim 3, further comprising programming the first and second predetermined thresholds.

5. The method of claim 1, further comprising disabling the SR transistor if the secondary current conduction time is greater than a last primary switching period.

6. A method of operating a switched power supply, the method comprising:
    determining a current load on a secondary side of a transformer, wherein determining the current load comprises measuring a ratio between a secondary side conduction time to a primary switching period of the power supply;
    comparing the current load with a predetermined threshold;
    disabling a synchronous rectification (SR) MOSFET coupled to the secondary side of the transformer if the current load is less than the predetermined threshold.

7. The method of claim 6, further comprising operating the switched power supply in a discontinuous conduction mode (DCM).

8. The method of claim 6, wherein measuring the ratio comprises:
    monitoring a drain voltage on the SR MOSFET;
    determining the secondary side conduction time based on how long the drain voltage remains within a drain measurement voltage range; and
    monitoring the primary switching period of the power supply.

9. The method of claim 6, wherein the switching power supply comprises a flyback power supply.

10. The method of claim 6, wherein measuring the ratio comprises:
    monitoring a drain voltage on a freewheeling transistor coupled to the secondary side of the transformer; and
    determining the secondary side conduction time based on how long the drain voltage remains within a drain voltage range; and
    monitoring the primary switching period of the power supply.

11. The method of claim 6, wherein the switching power supply comprises a forward converter.

12. A method for operating a synchronous rectification (SR) control system, the method comprising:
    controlling an SR operation mode, the controlling comprising
        determining a ratio of a secondary side current conduction time in a secondary coil to a primary switching period;
        setting the SR operation mode to a disabled mode if the ratio is less than a first predetermined threshold, wherein the disabled mode comprises shutting off a SR MOSFET coupled to the secondary coil, and
        setting the SR operation mode to an enabled mode if the ratio is greater than a second predetermined threshold, wherein the enabled mode comprises activating the SR MOSFET coupled to the secondary coil.

13. The method of claim 12, further comprising:

determining an end of a burst mode, the determining the end of the burst mode comprising
comparing an elapsed primary switching time with a third predetermined threshold, the third predetermined threshold greater than the first and second predetermined thresholds, and
disabling the SR control system if the elapsed primary switching time is greater than the third predetermined threshold.

14. The method of claim 13, further comprising setting the SR operation mode to enabled if a primary switching is detected.

15. The method of claim 13 wherein the ratio of the third threshold over the primary switching period is greater than one, and the ratio of the first and second thresholds over the primary switching period are less than one.

16. The method of claim 13 wherein the determining the end of the burst mode further comprises:
if the SR control system is in a disabled state and if a primary switching is detected, setting a flag and initiating a secondary switching period measurement;
if the flag is set and the SR control system is disabled
stopping the secondary switching period measurement,
storing the secondary switching period measurement into a first buffer and a second buffer,
multiplying the first buffer by a burst-off time constant forming a first result,
storing the first result into a third buffer,
reinitiating the secondary switching period measurement after storing the first result into the third buffer, and
enabling the SR control system; and
if the system is enabled
stopping the secondary switching period time measurement,
storing the secondary switching period time measurements into the first buffer,
reinitiating the secondary switching period time measurement after storing the secondary switching period time in the first buffer,
comparing contents of the first buffer to contents of the second buffer,
if the contents of the second buffer is less than the contents of the first buffer, updating the second buffer with the contents of the first buffer,
multiplying the contents of the second buffer by a burst-off time constant forming a second result,
storing the second result into the third buffer, and
controlling the SR operation mode.

17. A circuit for controlling a synchronous rectification (SR) transistor, the circuit comprising:
a voltage monitoring circuit configured to monitor a drain voltage of the SR transistor;
a time measurement circuit coupled to the voltage monitoring circuit, the time measurement circuit configured to measure a pulse width of the drain voltage of the SR transistor, and to measure a primary switching period;
a computation circuit configured to calculate a ratio of the drain voltage pulse width to the primary switching period, the computation circuit coupled to the time measurement circuit;
a comparison circuit configured to compare the ratio to a threshold, the comparison circuit coupled to the computation circuit;
a gate driver circuit comprising
an input coupled to the comparison circuit,
an output coupled to a gate of the SR transistor, wherein the gate driver circuit is configured to be active if the comparison circuit senses that the ratio exceeds the threshold.

18. The circuit of claim 17, wherein the computation circuit comprises a digital counter.

19. The circuit of claim 17, wherein the computation circuit comprises an analog timer.

20. The circuit of claim 17, wherein the circuit is configured to control the SR transistor in a switch mode power supply.

21. The circuit of claim 17, wherein the comparison circuit is further configured to apply hysteresis to the comparison between the ratio and the threshold.

22. A switched mode power supply comprising:
a transformer comprising a primary and secondary winding;
a synchronous rectification (SR) transistor comprising a drain coupled to the secondary winding;
a control circuit comprising
a driver output coupled to a gate of the SR transistor,
gate control circuit coupled to the driver output
a measurement input coupled to the secondary winding,
a timer circuit coupled to the measurement input, the timer configured to measure a drain pulse width and a primary switching period,
a comparison circuit coupled to the timer circuit and the gate control circuit, the comparison circuit configured to
compare a ratio of the drain pulse width to the primary switching period with a threshold, and
activate the driver output based on a relationship between the ratio and the threshold.

23. The switched mode power supply of claim 22, wherein the control circuit is configured to operate the power supply in a discontinuous conduction mode.

24. The switched mode power supply of claim 22, wherein
the power supply is configured in a flyback configuration; and
the measurement input is coupled to a drain of the SR transistor.

25. The switched mode power supply of claim 22, further comprising
an inductor coupled between the secondary winding and a power supply output; and
a freewheeling transistor comprising a drain coupled to the secondary winding and a gate coupled to the control circuit, wherein
the power supply is configured in a forward configuration, and
the measurement input is coupled to a the drain of the freewheeling transistor.

26. A method of operating a synchronous rectifier (SR) MOSFET based switching power supply, the method comprising:
incrementing a standby trigger counter if a current conduction time in a secondary coil of the switching power supply is less than a first threshold;
entering a standby mode, leaving a normal operation mode and resetting the standby trigger counter if the standby trigger counter reaches a first trigger count, wherein the standby mode comprises disabling the SR MOSFET;
resetting the standby trigger counter if the current conduction time in the secondary coil is not less then the first threshold; and entering the normal operation mode and leaving the standby mode if the current conduction time in the secondary coil is greater than a second threshold.

27. The method of claim 26, wherein the standby trigger counter only counts successive pulses.

28. The method of claim 27, wherein the first trigger count comprises a count of three.

29. The method of claim 26, wherein:
entering the normal operation mode comprises setting a normal operation flag; and
leaving the normal operation mode comprises resetting the normal operation flag.

\* \* \* \* \*